(12) United States Patent
Vasseur et al.

(10) Patent No.: US 8,718,055 B2
(45) Date of Patent: May 6, 2014

(54) FAST-TRACKING APPROACH FOR BUILDING ROUTING TOPOLOGIES IN FAST-MOVING NETWORKS

(75) Inventors: Jean-Philippe Vasseur, Saint Martin d'Uriage (FR); Sateesh K. Addepalli, San Jose, CA (US); Raghuram S. Sudhaakar, Mountain View, CA (US); Kevin C. Lee, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 198 days.

(21) Appl. No.: 13/358,361

(22) Filed: Jan. 25, 2012

(65) Prior Publication Data
US 2013/0188513 A1 Jul. 25, 2013

(51) Int. Cl.
*H04L 12/28* (2006.01)
(52) U.S. Cl.
USPC .......... 370/389; 370/252; 709/242; 455/452.1
(58) Field of Classification Search
None
See application file for complete search history.

(56) References Cited

U.S. PATENT DOCUMENTS

| | | | |
|---|---|---|---|
| 2010/0169937 A1* | 7/2010 | Atwal et al. | 725/68 |
| 2011/0164527 A1* | 7/2011 | Mishra et al. | 370/252 |
| 2012/0265818 A1* | 10/2012 | Van Phan et al. | 709/204 |

OTHER PUBLICATIONS

Gnawali, et al., "The Minimum Rank Objective Function with Hysteresis", draft-ieft-roll-minrank-hysteresis-of-04, IETF Internet-Draft, May 2011, 11 pages.
Thubert, et al., "RPL Objective Function Zero", draft-ietf-roll-of0-15, IETF Internet-Draft, Jul. 2011, 14 pages.
Vasseur, et al., "Routing Metrics Used for Path Calculation in Low Power and Lossy Networks", draft-ietf-roll-routing-metrics-19, IETF Internet-Draft, Mar. 2011, 31 pages.
Winter, et al., "RPL: IPv6 Routing Protocol for Low Power and Lossy Networks", draft-ietf-roll-rpl-19, IETF Internet-Draft; Mar. 2011, 164 pages.
Iwata, et al., "Scalable Routing Strategies for Ad Hoc Wireless Networks", IEEE Journal on Selected Areas in Communications, Aug. 1999, pp. 1369-1379, vol. 17, No. 8, IEEE Service Center, Piscataway, New Jersey.
Pettersson, et al., "Notification of Transmittal of the International Search Report and the Written Opinion of the International Searching Authority, or the Declaration", Patent Cooperation Treaty, Apr. 29, 2013, 7 pages, PCT/US2013/023131, European Patent Office, Rijswijk, Netherlands.

* cited by examiner

*Primary Examiner* — Jianye Wu
(74) *Attorney, Agent, or Firm* — Edwards Wildman Palmer LLP; James M. Behmke; Stephen D. LeBarron

(57) ABSTRACT

In one embodiment, a local node in a communication network determines a set of its neighbor nodes, and determines a respective occurrence frequency at which each particular neighbor node is to be probed based on a rate of change in distance between the local node and the particular neighbor node. The local node may then probe each particular neighbor node according to the respective occurrence frequency to determine the rate of change in distance between the local node and each particular neighbor node, and one or more routing metrics for reaching each particular neighbor node. As such, the local node may select, based on the probing, a suitable preferred next-hop node of the set of neighbor nodes for a corresponding routing topology.

24 Claims, 14 Drawing Sheets

| NODE 805 | SIGNAL STRENGTH 810 | COST 815 | DISTANCE 820 | SPEED VECTOR 825 | ACCELERATION 830 | OTHER ROUTING METRICS 835 |
|---|---|---|---|---|---|---|
| N1 | (X→N1) | (X→N1) | (X→N1) | (N1) | (N1) | (N1) |
| N2 | (X→N2) | (X→N2) | (X→N2) | (N2) | (N2) | (N2) |
| N3 | (X→N3) | (X→N3) | (X→N3) | (N3) | (N3) | (N3) |
| ... | ... | ... | ... | ... | ... | ... |

TABLE 800

ENTRIES 850

FIG. 8

FAST-TRACKING APPROACH FOR BUILDING ROUTING TOPOLOGIES IN FAST-MOVING NETWORKS

TECHNICAL FIELD

The present disclosure relates generally to computer networks, and, more particularly, to routing topology management for networks with fast-moving devices.

BACKGROUND

With the sharp increase of vehicles on roads in the recent years, driving has not stopped from being more challenging and dangerous. Roads are saturated, safety distance and reasonable speeds are hardly respected, and drivers often lack enough attention. Without a clear signal of improvement in the near future, leading car manufacturers decided to jointly work with national government agencies to develop solutions aimed at helping drivers on the roads by anticipating hazardous events or avoiding bad traffic areas. One of the outcomes has been a new type of wireless access called Wireless Access for Vehicular Environment (WAVE) dedicated to vehicle-to-vehicle and vehicle-to-roadside communications. While the major objective has clearly been to improve the overall safety of vehicular traffic, promising traffic management solutions and on-board entertainment applications are also expected in this field.

When equipped with WAVE communication devices, cars and roadside units form a highly dynamic network called a Vehicular Ad Hoc Network (VANET), a special kind of Mobile Ad Hoc Network (MANET) where vehicles communicate with one another through wireless infrastructures to the Internet using a multihop-to-infrastructure routing protocol.

Although designed for Low power and Lossy Networks (LLNs), such as sensor networks, the Routing Protocol for LLNs (RPL) is clearly an ideal candidate for routing in a VANET. For instance, RPL is a distance vector routing protocol that builds a Destination Oriented Directed Acyclic Graph (DODAG, or simply DAG) in addition to a set of features to bound the control traffic, support local repair, etc., and provides a flexible method by which each node performs DODAG discovery, construction, and maintenance. However, RPL has been inherently designed for fixed low-speed networks interconnecting highly constrained devices (in terms of CPU processing, memory, and energy). Thus, RPL does not use keepalive mechanisms to maintain routing adjacencies, but rather relies on dataplane verification to detect that a next-hop is alive when sending data packets. Although RPL could be augmented with keepalives, this does not allow for efficient connectivity maintenance in highly mobile (fast-moving) networks such as a VANET.

BRIEF DESCRIPTION OF THE DRAWINGS

The embodiments herein may be better understood by referring to the following description in conjunction with the accompanying drawings in which like reference numerals indicate identically or functionally similar elements, of which:

FIG. 8 illustrates an example neighbor table.

DESCRIPTION OF EXAMPLE EMBODIMENTS

Overview

According to one or more embodiments of the disclosure, a local node in a communication network determines a set of its neighbor nodes, and determines a respective occurrence frequency at which each particular neighbor node is to be probed based on a rate of change in distance between the local node and the particular neighbor node. The local node may then probe each particular neighbor node according to the respective occurrence frequency to determine the rate of change in distance between the local node and each particular neighbor node, and one or more routing metrics for reaching each particular neighbor node. As such, the local node may select, based on the probing, a suitable preferred next-hop node of the set of neighbor nodes for a corresponding routing topology.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routes (and associated hosts) connected by wireless links, the union of which forms an arbitrary topology.

Figure 1:
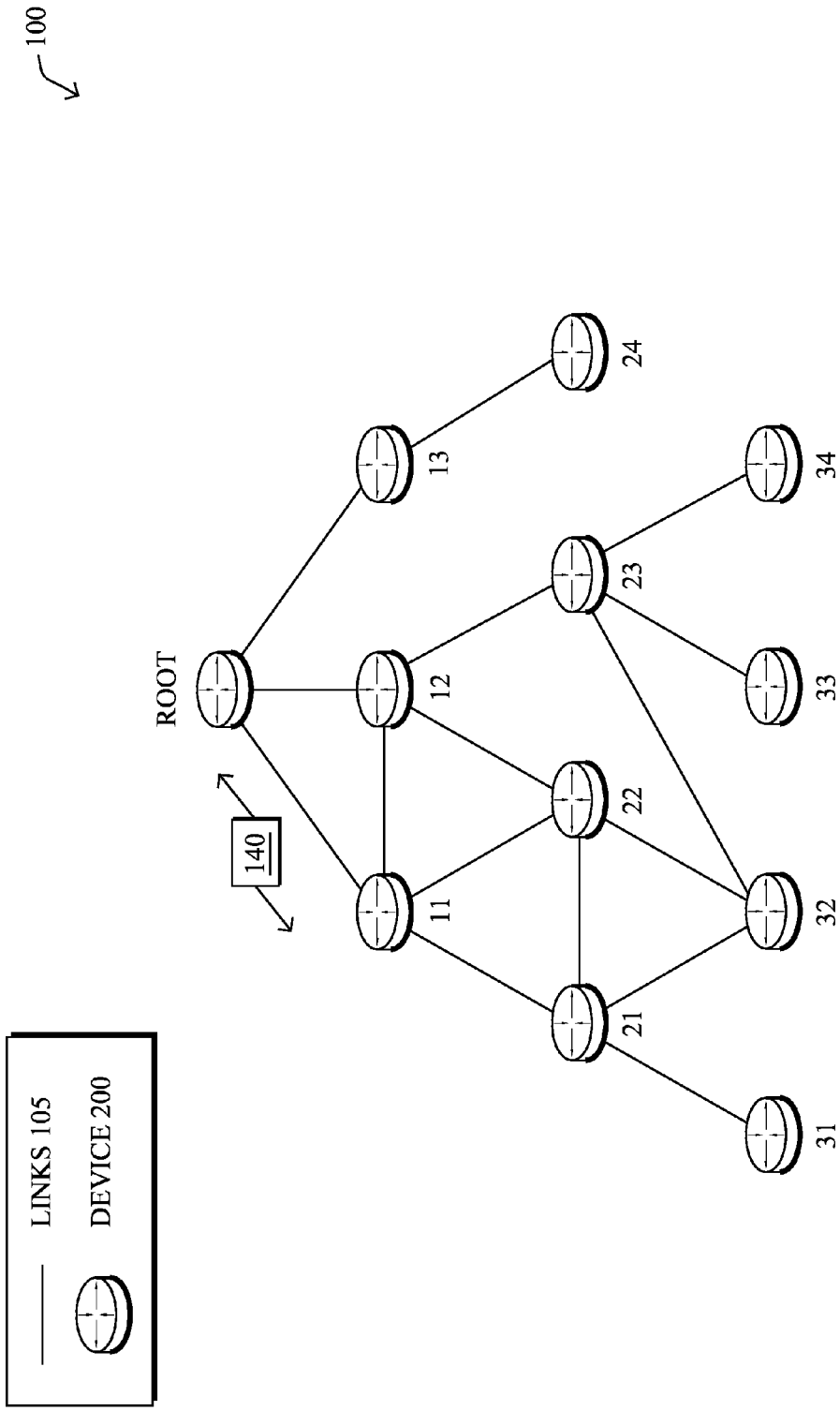
FIG. 1 illustrates an example communication network.

FIG. 1 is a schematic block diagram of an example computer network 100 illustratively comprising nodes/devices 200 (e.g., labeled as shown, "ROOT," "11," "12," ... "34," and described in FIG. 2 below) interconnected by various methods of communication. For instance, the links 105 may generally be wireless links, where certain nodes 200, such as, e.g., routers, sensors, computers, etc., may be in communication with other nodes 200, e.g., based on distance, signal strength, current operational status, location, etc. Those skilled in the art will understand that any number of nodes, devices, links, etc. may be used in the computer network, and that the view shown herein is for simplicity. Also, those skilled in the art will further understand that while the network is shown in a certain orientation, particularly with a "root" border router node, the network 100 is merely an example illustration that is not meant to limit the disclosure.

Data packets 140 (e.g., traffic and/or messages sent between the devices/nodes) may be exchanged among the nodes/devices of the computer network 100 using predefined network communication protocols such as certain known wireless protocols (e.g., IEEE Std. 802.15.4, WiFi, Bluetooth®, etc.), or other protocols where appropriate. In this context, a protocol consists of a set of rules defining how the nodes interact with each other.

Figure 2:
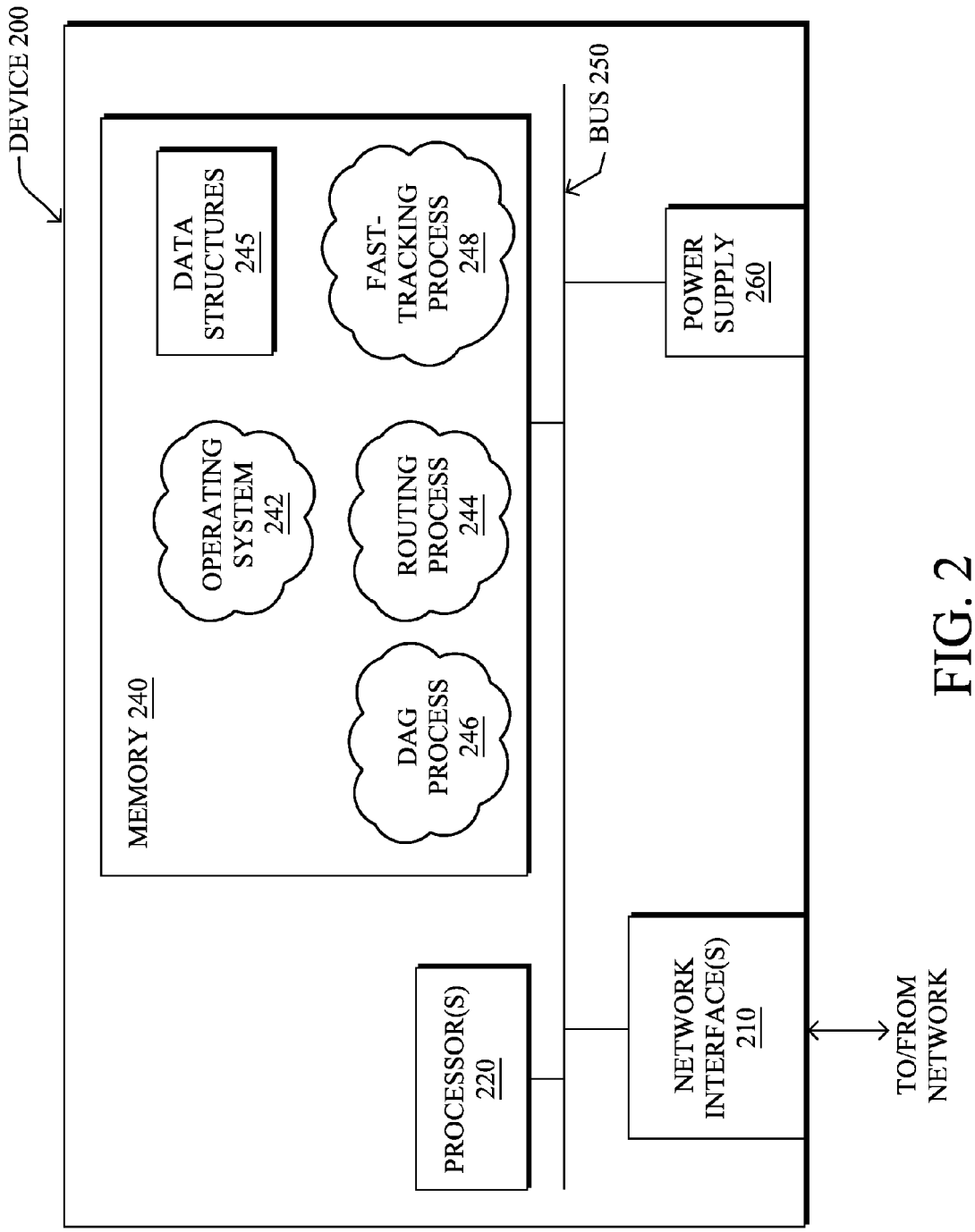
FIG. 2 illustrates an example network device/node.

FIG. 2 is a schematic block diagram of an example node/device 200 that may be used with one or more embodiments described herein, e.g., as any of the nodes shown in FIG. 1 above. The device may comprise one or more wireless network interfaces 210, at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links 105 coupled to the network 100. The network interfaces may be configured to transmit and/or receive data using a variety of different communication protocols. Note, further, that certain nodes may have two different types of network connections 210, e.g., wireless and wired/physical connections, and that the view herein is merely for illustration. For example, while some devices 200 may be entirely mobile (e.g., cars), other devices 200 may represent unmoving devices, and may allow for a wired connection, accordingly.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise necessary elements or logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise routing process/services 244, a directed acyclic graph (DAG) process 246, and an illustrative fast-tracking process 248, as described herein. Note that while fast-tracking process 248 (and the other processes) is/are shown in centralized memory 240, alternative embodiments provide for one or more of the processes to be specifically operated within the network interfaces 210.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Notably, mesh networks have become increasingly popular and practical in recent years. In particular, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point such at the root node to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

An example protocol specified in an Internet Engineering Task Force (IETF) Internet Draft, entitled "RPL: IPv6 Routing Protocol for Low Power and Lossy Networks" <draft-ietf-roll-rpl-19> by Winter, at al. (Mar. 13, 2011 version), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

A DAG is a directed graph having the property that all edges (and/or vertices) are oriented in such a way that no cycles (loops) are supposed to exist. All edges are contained in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Further, in certain embodiments, a sibling of a node within a DAG may be defined as any neighboring node which is located at the same rank within a DAG. Note that siblings do not necessarily share a common parent, and routes between siblings are generally not part of a DAG since there is no forward progress (their rank is the same). Note also that a tree is a kind of DAG, where each device/node in the DAG generally has one parent or one preferred parent.

DAGs may generally be built (e.g., by DAG process 246) based on an Objective Function (OF). The role of the Objective Function is generally to specify rules on how to build the DAG (e.g. number of parents, backup parents, etc.).

In addition, one or more metrics/constraints may be advertised by the routing protocol to optimize the DAG against. Also, the routing protocol allows for including an optional set of constraints to compute a constrained path, such as if a link or a node does not satisfy a required constraint, it is "pruned" from the candidate list when computing the best path. (Alternatively, the constraints and metrics may be separated from the OF.) Additionally, the routing protocol may include a "goal" that defines a host or set of hosts, such as a host serving as a data collection point, or a gateway providing connectivity to an external infrastructure, where a DAG's primary objective is to have the devices within the DAG be able to reach the goal. In the case where a node is unable to comply with an objective function or does not understand or support the advertised metric, it may be configured to join a DAG as a leaf node. As used herein, the various metrics, constraints, policies, etc., are considered "DAG parameters."

Illustratively, example metrics used to select paths (e.g., preferred parents) may comprise cost, delay, latency, bandwidth, expected transmission count (ETX), etc., while example constraints that may be placed on the route selection may comprise various reliability thresholds, restrictions on battery operation, multipath diversity, bandwidth requirements, transmission types (e.g., wired, wireless, etc.). The OF may provide rules defining the load balancing requirements, such as a number of selected parents (e.g., single parent trees or multi-parent DAGs). Notably, an example for how routing metrics and constraints may be obtained may be found in an IETF Internet Draft, entitled "Routing Metrics used for Path Calculation in Low Power and Lossy Networks" <draft-ietf-roll-routing-metrics-19> by Vasseur, et al. (Mar. 1, 2011 version). Further, an example OF (e.g., a default OF) may be found in an IETF Internet Draft, entitled "RPL Objective Function 0" <draft-ietf-roll-of0-15> by Thubert (Jul. 8, 2011 version) and "The Minimum Rank Objective Function with Hysteresis" <draft-ietf-roll-minrank-hysteresis-of-04> by O. Gnawali et al. (May 17, 2011 version).

Building a DAG may utilize a discovery mechanism to build a logical representation of the network, and route dissemination to establish state within the network so that routers know how to forward packets toward their ultimate destination. Note that a "router" refers to a device that can forward as well as generate traffic, while a "host" refers to a device that can generate but does not forward traffic. Also, a "leaf" may be used to generally describe a non-router that is connected to a DAG by one or more routers, but cannot itself forward traffic received on the DAG to another router on the DAG. Control messages may be transmitted among the devices within the network for discovery and route dissemination when building a DAG.

According to the illustrative RPL protocol, a DODAG Information Object (DIO) is a type of DAG discovery message that carries information that allows a node to discover a RPL Instance, learn its configuration parameters, select a DODAG parent set, and maintain the upward routing topology. In addition, a Destination Advertisement Object (DAO) is a type of DAG discovery reply message that conveys destination information upwards along the DODAG so that a DODAG root (and other intermediate nodes) can provision downward routes. A DAO message includes prefix information to identify destinations, a capability to record routes in support of source routing, and information to determine the freshness of a particular advertisement. Notably, "upward" or "up" paths are routes that lead in the direction from leaf nodes towards DAG roots, e.g., following the orientation of the edges within the DAG. Conversely, "downward" or "down" paths are routes that lead in the direction from DAG roots towards leaf nodes, e.g., generally going in the opposite direction to the upward messages within the DAG.

Generally, a DAG discovery request (e.g., DIO) message is transmitted from the root device(s) of the DAG downward toward the leaves, informing each successive receiving device how to reach the root device (that is, from where the request is received is generally the direction of the root). Accordingly, a DAG is created in the upward direction toward the root device. The DAG discovery reply (e.g., DAO) may then be returned from the leaves to the root device(s) (unless unnecessary, such as for UP flows only), informing each successive receiving device in the other direction how to reach the leaves for downward routes. Nodes that are capable of maintaining routing state may aggregate routes from DAO messages that they receive before transmitting a DAO message. Nodes that are not capable of maintaining routing state, however, may attach a next-hop parent address. The DAO message is then sent directly to the DODAG root that can in turn build the topology and locally compute downward routes to all nodes in the DODAG. Such nodes are then reachable using source routing techniques over regions of the DAG that are incapable of storing downward routing state. In addition, RPL also specifies a message called the DIS (DODAG Information Solicitation) message that is sent under specific circumstances so as to discover DAG neighbors and join a DAG or restore connectivity.

Figure 3:
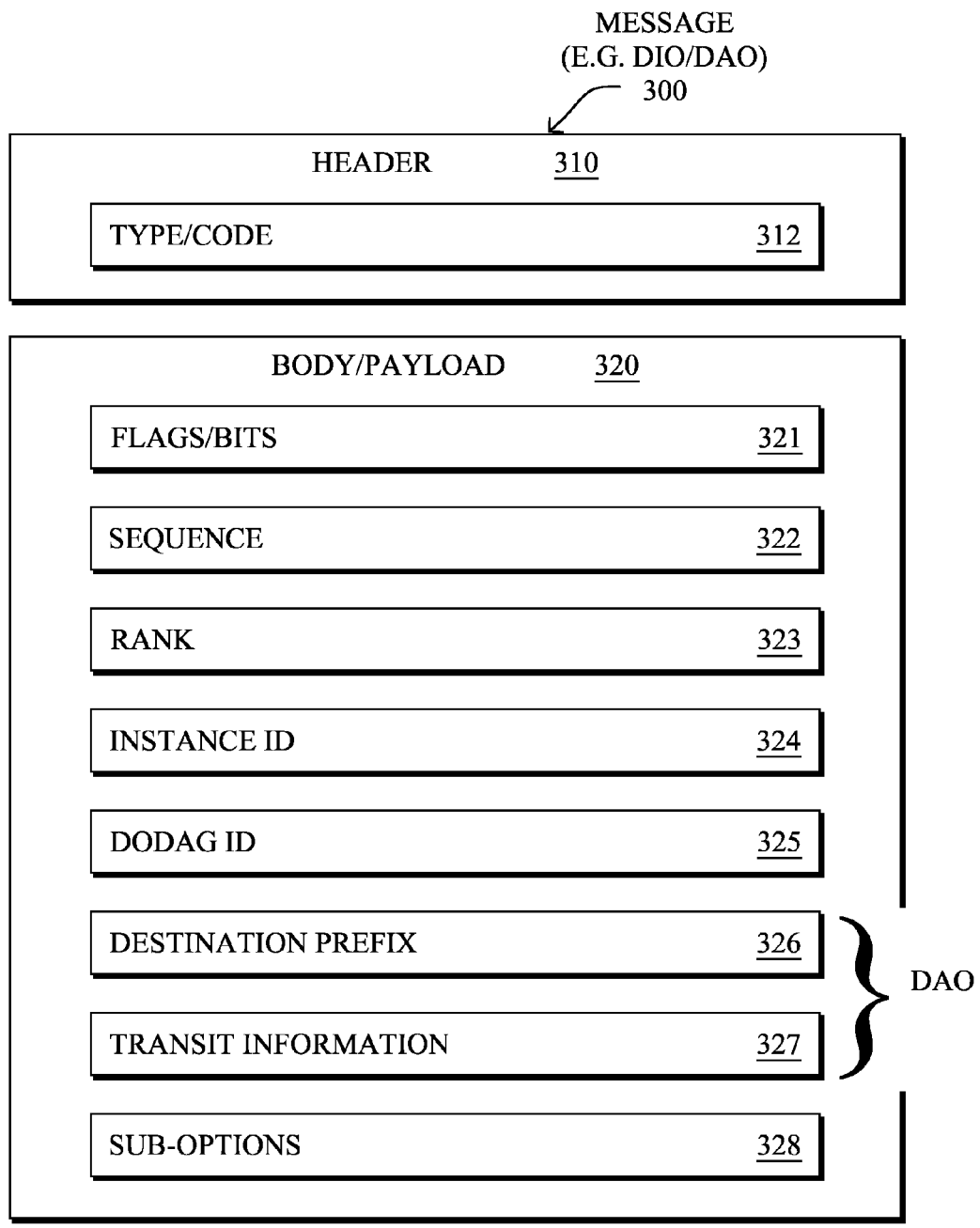
FIG. 3 illustrates an example message format.

FIG. 3 illustrates an example simplified control message format 300 that may be used for discovery and route dissemination when building a DAG, e.g., as a DIO, DAO, or DIS message. Message 300 illustratively comprises a header 310 with one or more fields 312 that identify the type of message (e.g., a RPL control message), and a specific code indicating the specific type of message, e.g., a DIO, DAO, or DIS. Within the body/payload 320 of the message may be a plurality of fields used to relay the pertinent information. In particular, the fields may comprise various flags/bits 321, a sequence number 322, a rank value 323, an instance ID 324, a DODAG ID 325, and other fields, each as may be appreciated in more detail by those skilled in the art. Further, for DAO messages, additional fields for destination prefixes 326 and a transit information field 327 may also be included, among others (e.g., DAO_Sequence used for ACKs, etc.). For any type of message 300, one or more additional sub-option fields 328 may be used to supply additional or custom information within the message 300. For instance, an objective code point (OCP) sub-option field may be used within a DIO to carry codes specifying a particular objective function (OF) to be used for building the associated DAG. Alternatively, sub-option fields 328 may be used to carry other certain information within a message 300, such as indications, requests, capabilities, lists, notifications, etc., as may be described herein, e.g., in one or more type-length-value (TLV) fields.

Figure 4:
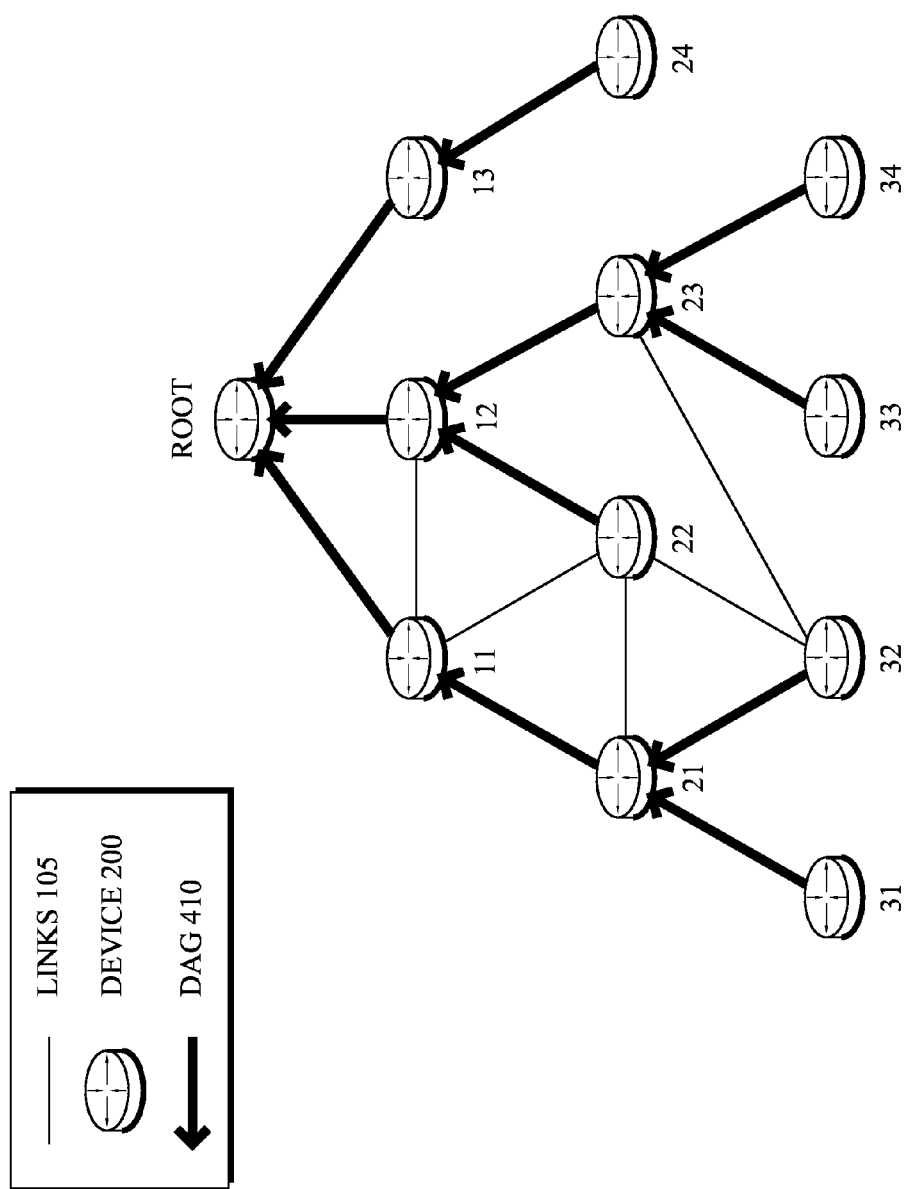
FIG. 4 illustrates an example directed acyclic graph (DAG) in the communication network in FIG. 1.

FIG. 4 illustrates an example simplified DAG that may be created, e.g., through the techniques described above, within network 100 of FIG. 1. For instance, certain links 105 may be selected for each node to communicate with a particular parent (and thus, in the reverse, to communicate with a child, if one exists). These selected links form the DAG 410 (shown as solid bolded lines), which extends from the root node toward one or more leaf nodes (nodes without children). Traffic/packets 140 (shown in FIG. 1) may then traverse the DAG 410 in either the upward direction toward the root or downward toward the leaf nodes, particularly as described herein. In addition, the creation of the DAG may also provide for one or more alternate parents (next-hops). Note that while a DAG 410 is shown, other distance vector routing topologies may be created, and a DAG, particularly one created using RPL, is merely one example of a routing protocol topology that may be created and utilized according to the techniques described herein.

As noted above, a type of wireless access called Wireless Access for Vehicular Environment (WAVE) has been established that is dedicated to vehicle-to-vehicle and vehicle-to-roadside communications. While the major objective has clearly been to improve the overall safety of vehicular traffic, promising traffic management solutions and on-board entertainment applications are also expected in this field. When equipped with WAVE communication devices, cars, and roadside units (RSUs) form a highly dynamic network called a Vehicular Ad Hoc Network (VANET), a special kind of MANET, where vehicles communicate with one another through wireless infrastructures to the Internet using a multihop-to-infrastructure routing protocol.

Figure 5:
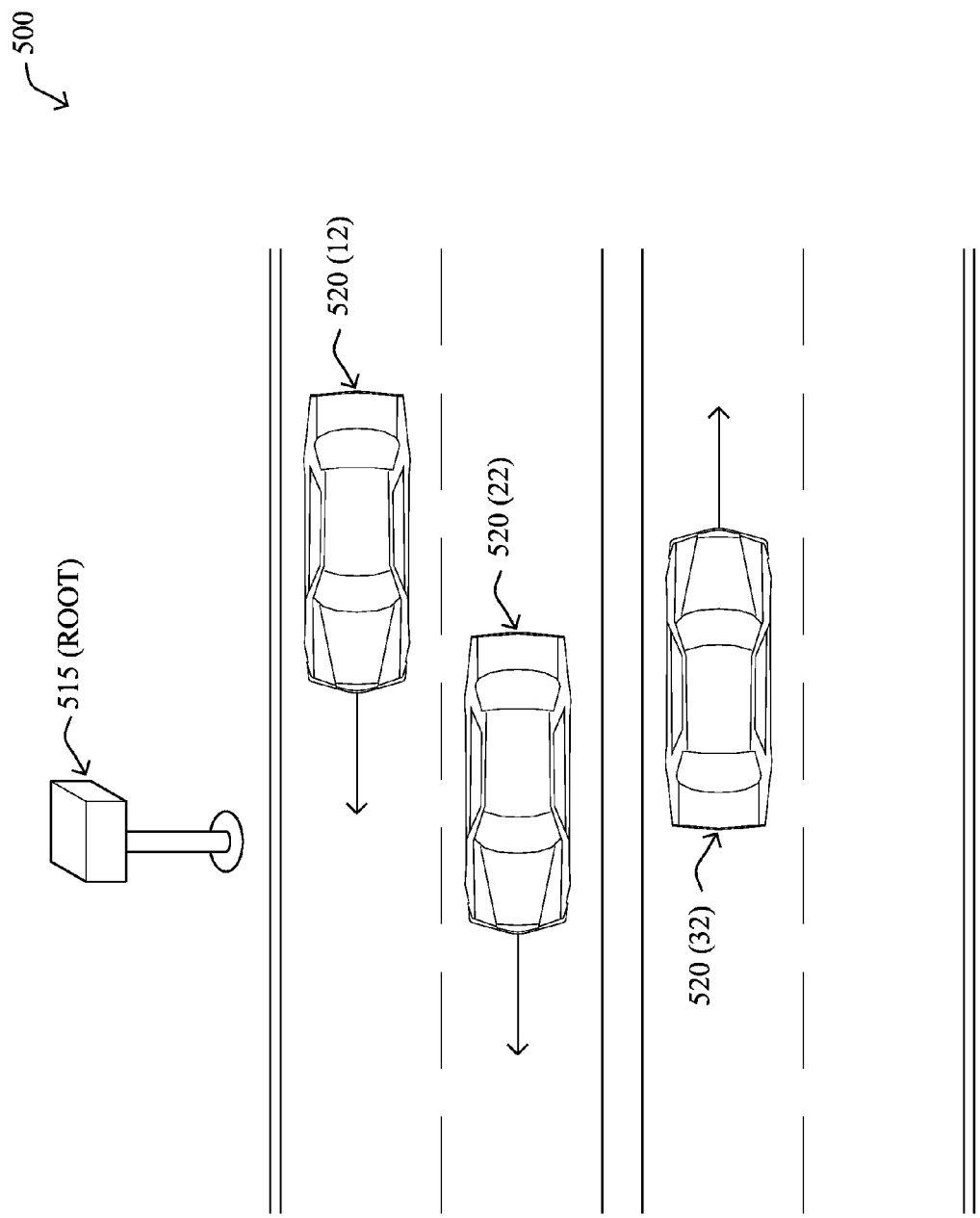
FIG. 5 illustrates an example of a specific example of a Vehicular Ad Hoc Network (VANET)

As an example, FIG. 5 illustrates a simplified VANET scenario 500 (with node references from the topology in FIG. 1), where a plurality of vehicles (cars, trucks, etc.) 520 may be in proximity to one another, while traveling at different speeds and directions. Also, one or more RSUs 515 may also be present along side the roadway, whether placed specifically for the purpose of vehicular communication (e.g., highways), or else another roadside unit configuration, such as a WiFi hotspot in the city.

Note that as free WiFi networks become predictably more accessible from vehicles, users will have a strong economic incentive to opportunistically offload data traffic from 3G and 4G links to free WiFi links. Since WiFi deployment is not prevalent, enabling vehicles to access roadside WiFi through other vehicles (multihop-to-infrastructure) allow more vehicles to take advantage of data offloading. From the perspective of the service providers, enabling vehicles to use a multihop-to-infrastructure architecture reduces the number of WiFi access points they need to deploy, thereby reducing the capital cost of WiFi infrastructure rollout. Moreover, as more vehicles are connected in the future, the network will inevitably support applications beyond safety to infotainment, video streaming, online gaming, etc. These applications tend to carry high volume data traffic, making ad hoc 802.11 type of wireless communication a suitable strategy. Thus, enabling mulithop-to-infrastructure connectivity generally requires the support of a multihop-to-infrastructure vehicular routing protocol.

Intuitively, a tree topology is best suited for vehicles multi-hopping to road-side infrastructures. RPL, originally designed to meet specific requirements in LLNs such as sensor networks, can be adapted to meet VANET's requirements that consider channel congestion, channel characteristics, hidden terminals, vehicular traffic density, mobility, and many other factors. Although RPL is an ideal candidate for routing in a VANET, RPL has been inherently designed for fixed low-speed networks interconnecting highly constrained devices (in terms of CPU processing, memory and energy). In particular, RPL does not make use of keepalive mechanisms (such as OSPF) to maintain routing adjacencies, but rather relies on dataplane verification to detect that a next-hop is alive when sending data packets, e.g., thanks to IPv6 "NUD" or link-layer acknowledgments. Although RPL could be augmented with keepalive functionality, this does not solve the problem of maintaining connectivity in highly mobile networks such as VANET.

Fast-Tracking

The techniques herein allow for "fast-moving" nodes (as compared generally to stationary nodes), for example, vehicles, mobile user devices, etc., to dynamically track parameters such as their relative distance (movement), speed vector, acceleration, signal strength, and other, more conventional, routing metrics, with the use of dynamically adjusted local tracking messages (probes). By doing to, the techniques herein allow the nodes to anticipate a lack of connectivity, and thus maintain routing connectivity by dynamically re-arranging a neighbor table list (preferred next-hop selection) in a fast-moving environment.

Specifically, according to one or more embodiments of the disclosure as described in detail below, a local node in a communication network determines a set of its neighbor nodes, and determines a respective occurrence frequency at which each particular neighbor node is to be probed based on a rate of change in distance between the local node and the particular neighbor node. The local node may then probe each particular neighbor node according to the respective occurrence frequency to determine the rate of change in distance between the local node and each particular neighbor node, and one or more routing metrics for reaching each particular neighbor node. As such, the local node may select, based on the probing, a suitable preferred next-hop node of the set of neighbor nodes for a corresponding routing topology.

Illustratively, the techniques described herein may be performed by hardware, software, and/or firmware, such as in accordance with the fast-tracking process 248, which may contain computer executable instructions executed by the processor 220 (or independent processor of interfaces 210) to perform functions relating to the techniques described herein, e.g., in conjunction with routing process 244 (and/or DAG process 246). For example, the techniques herein may be treated as extensions to conventional protocols, such as the illustrative RPL protocol or wireless communication protocols, and as such, may be processed by similar components understood in the art that execute those protocols, accordingly.

The techniques herein specify a fast-tracking mechanism so as to maximize connectivity between nodes (e.g., vehicles) and avoid costly DAG repairs (or in general, routing topology repairs). Illustratively, the techniques herein extend existing RPL mechanisms. Indeed, routing adjacency is difficult to maintain in proactive protocols like RPL even when activating keepalive probes (as in existing protocols like OSPF). In a fast-moving environment, for instance, if Vehicle-1 has selected Vehicle-2 as best next-hop (preferred parent), a fast keepalive will allow Vehicle-1 to quickly detect that Vehicle-2 is no longer reachable. Although fast keepalive allows for detecting the loss of the neighbor, it does not trigger routing protocol convergence, and does not solve the problem of maintaining topology connectivity.

For instance, referring to the previous example, if the best next-hop (Vehicle-2) is no longer reachable, in the absence of a back-up next-hop, this would trigger local repair whereby Vehicle-1 would send a DIS, discover a new set of neighbors, with a risk of a loop. Such an operation is costly and not likely to work in a VANET simply because the topology may have changed by the time a node discovers its neighbors and may simply not converge.

Figure 6:
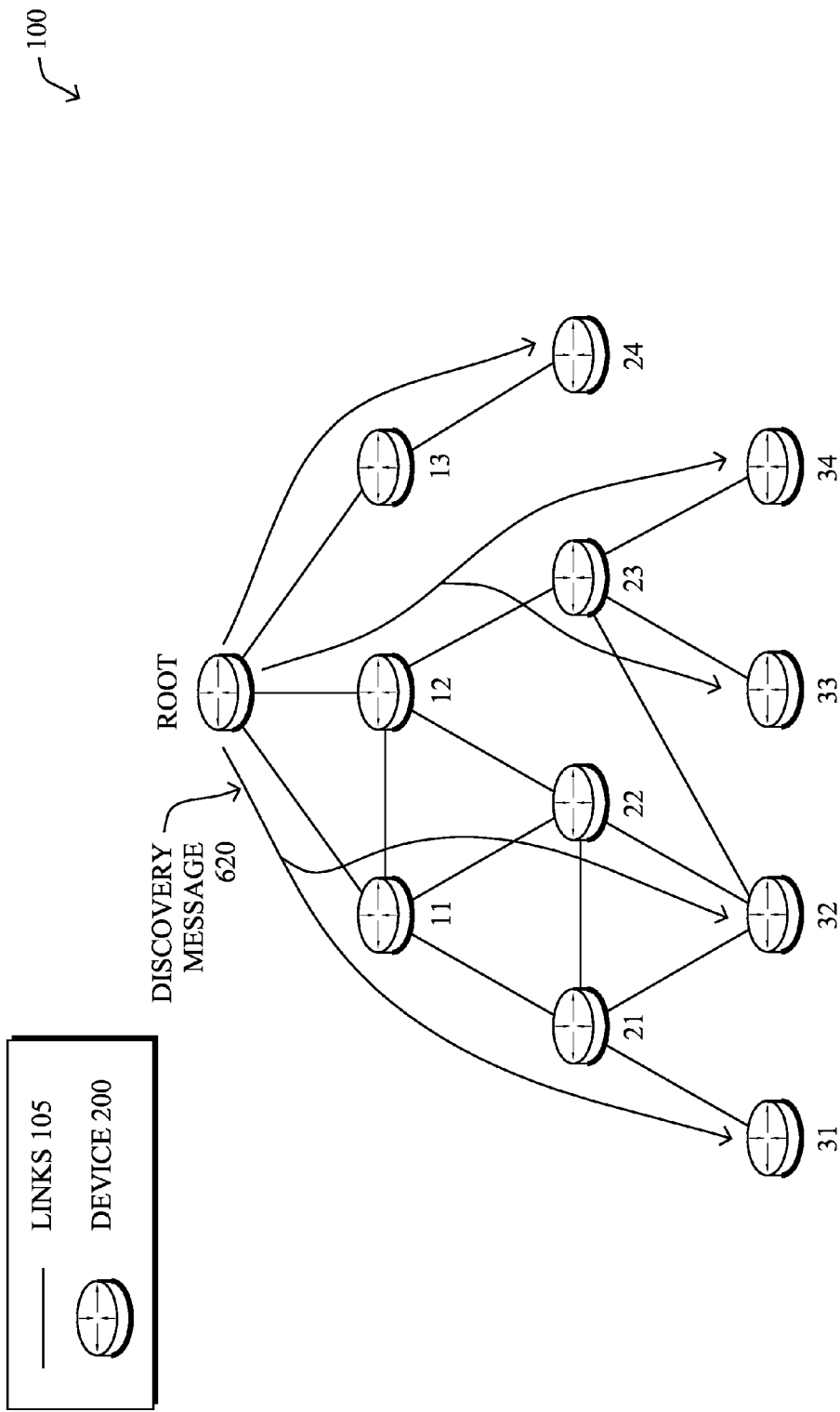
FIG. 6 illustrates an example discover message exchange.

Operationally, a core aspect of the techniques herein is anticipating movement of neighbors/next-hops so as to switch to a backup next-hop and maintain connectivity in a fast-moving environment. A first component of the techniques herein is to have a local node (e.g., node 22) determine a set of neighbor nodes in a communication network 100, such as through a discovery message 620 as shown in FIG. 6. For example, in one specific embodiment, the techniques rely on adding an optional TLV in the routing discovery messages (such as the DIO 300 in the case of RPL) to signal that the node supports "location tracking" (e.g., an "LC" flag). A node sets the LC flag when it is capable of providing its "location" thanks to various technologies (e.g., global positioning systems, "GPS"). The techniques may thus limit the probing to neighbor nodes that are, in fact, capable of being probed.

Figure 7:
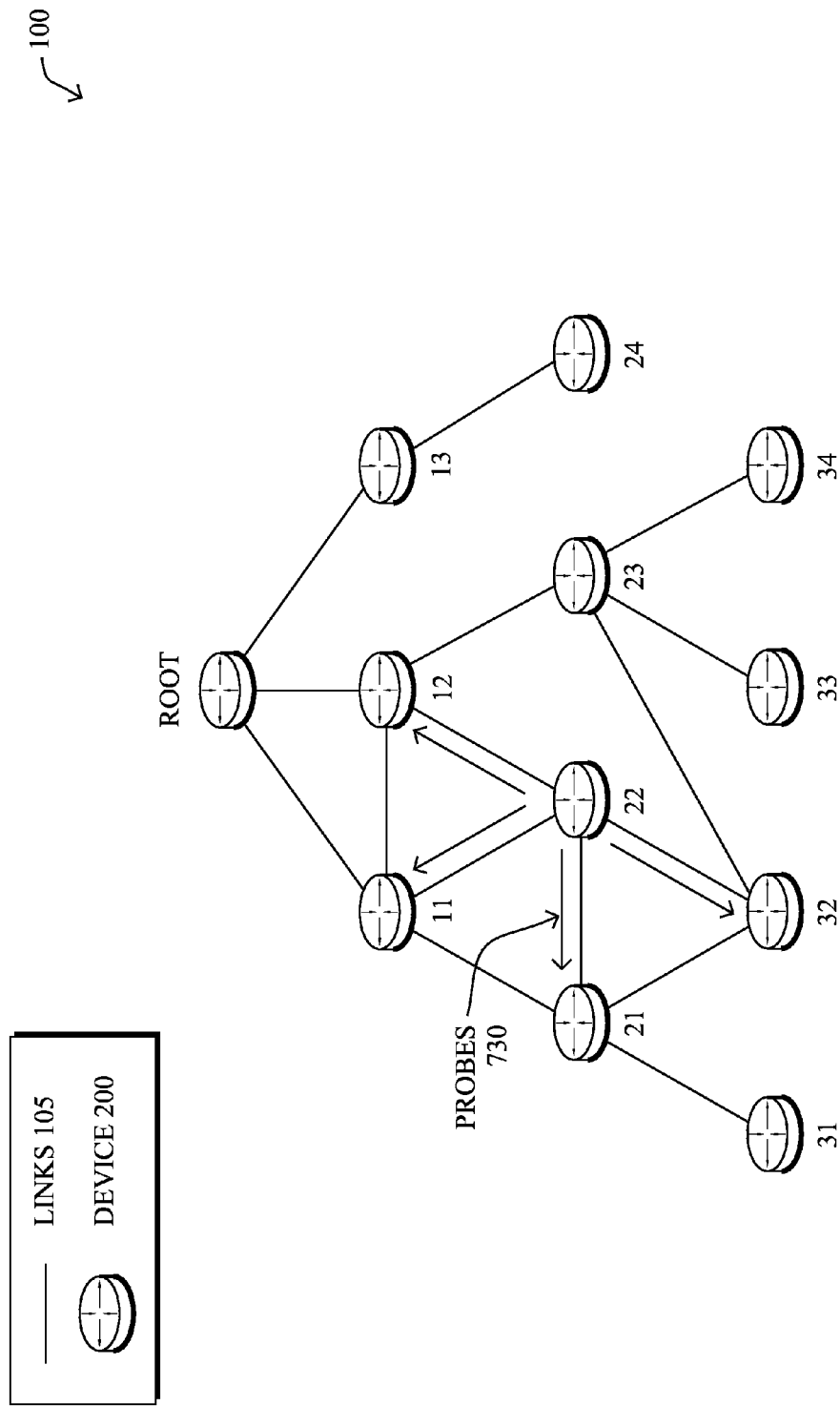
FIG. 7 illustrates an example fast-tracking probing exchange.

When a node (e.g., vehicle) "X" joins the routing topology (e.g., DAG 410), it first determines the list of neighbors (who replied to a DIS by sending a DIO) and starts activating a tracking( ) procedure. The tracking( ) procedure, in particular, illustratively sends fast-tracking messages (probes 730 as shown in FIG. 7) to each discovered (and capable) neighbor "Ni," at a respective, and dynamically computed, occurrence frequency "Fi" (notably not a transmission frequency/channel, but rather an interval/rate of repeated transmissions). That is, the local node "X" (e.g., node 22) determines a respective occurrence frequency at which each particular neighbor node is to be probed. As described below, the frequency Fi is based on a rate of change in distance between the local node and each particular neighbor node.

By probing each particular neighbor node (probe 730), according to the respective occurrence frequency Fi, the local node may determine the rate of change in distance between itself and each particular neighbor node, and also one or more routing metrics for reaching each particular neighbor node. For example, the probing may determine/gather node Ni's signal strength, speed vector, acceleration, current location, and other routing metrics. The speed vector, acceleration, current location, for example, may be available from Ni's sensors and/or GPS Navigation System. Note that in one specific embodiment, the gathered information provided may be cached if they have not changed significantly. For example, suppose that the a speed and location have not changed significantly, then the probe replies may simply contain a tag value used to indicate that the speed and location have not changed significantly so as to compress the information.

In addition, the local node also selects, based on the probing, a set of n next-hops in order of preference according to the objective function of the routing protocol and the discovered routing metrics (e.g., shortest according to delay, path cost, etc.). For example, the selected preferred next-hop node (e.g., a parent node) may be selected based on having the best set of routing metrics according to a directive (objective function) of the routing protocol used to compute the corresponding routing topology. In addition, other alternate next-hop nodes (e.g., backup parent nodes) may also be selected, based on the probing results. Notably, the selected next-hop nodes must be "suitable," meaning that they are within a particular threshold distance (e.g., a certain signal strength or actual physical distance) of the local node.

As shown in FIG. 8, the local node may store a table 800 (e.g., a data structure 245 in memory 240) that contains a plurality of entries 850 having a plurality of corresponding fields. For instance, illustrative fields may comprise a node name 805, a signal strength 810, a path cost 815, a distance 820, a speed vector 825, an acceleration value 830, and other routing metrics (e.g., delay, jitter, etc.) 835. Those skilled in the art will appreciate that the table 800 may arrange the fields and entries in any particular order, and that more or fewer entries/fields may be used within the scope of the techniques herein.

Figure 9:
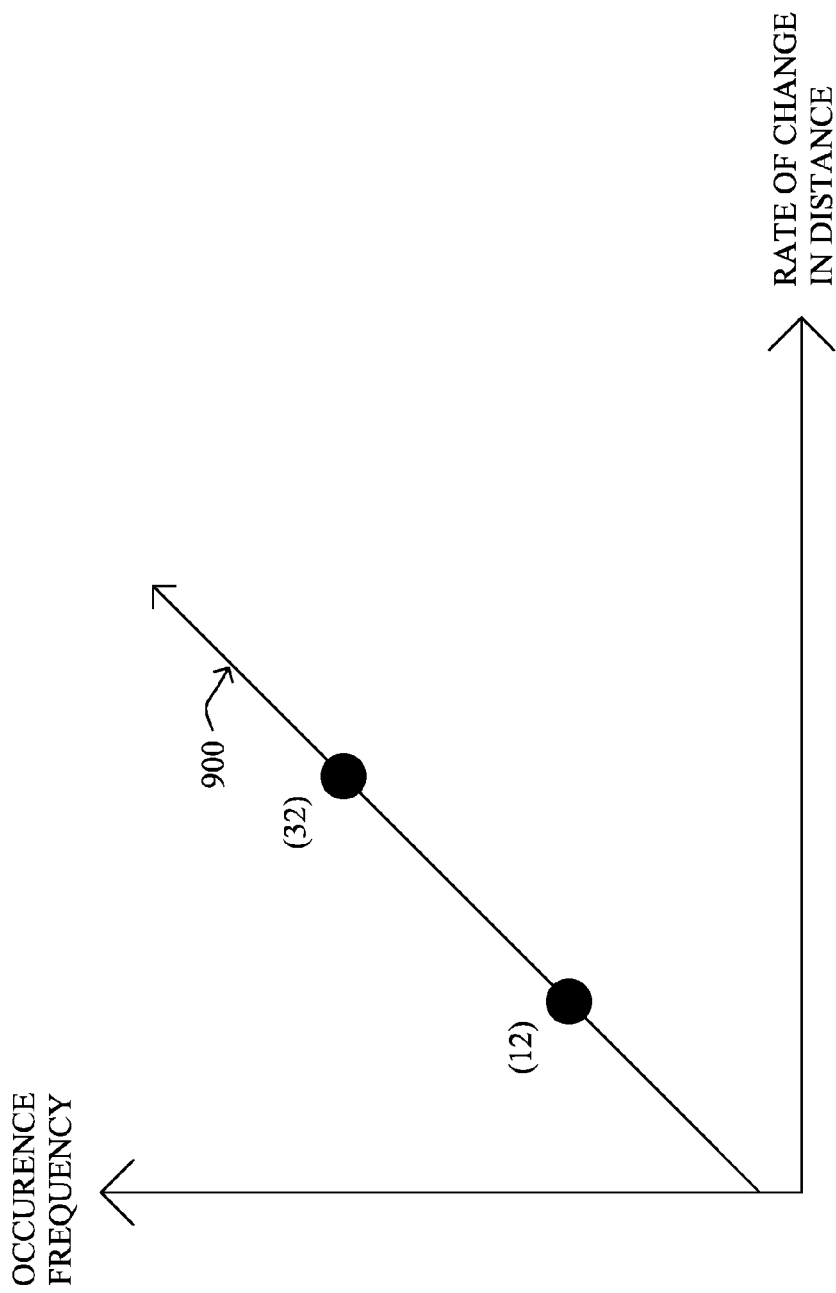
FIG. 9 illustrates an example probing frequency relationship to a rate of change in distance.

As mentioned above, probes 730 are sent at a frequency denoted as Fi, which is dynamically adjusted through a feedback loop mechanism based on the highly mobile network topology. In general, as illustrated in FIG. 9, the occurrence frequency Fi (900) for a particular node Ni may be directly related to the rate of change in distance (e.g., signal strength and/or physical distance between the nodes). For example, the occurrence frequency increases when the rate of change in distance increases (notably, when the signal strength decreases), and decreases when the rate of change in distance decreases (when the signal strength increases). The rate of change in distance, i.e., how fast or slow the distance is increasing or decreasing, may be determined by the position of the neighbors to the node, their speed vector, acceleration, and/or how fast the signal strength varies. In other words, a relatively simple algorithm may be used so as to determine whether the distance between the local node X and a particular neighbor node Ni is stable, slowly increasing/decreasing, or rapidly increasing/decreasing. That is, the local node determines that the distance is quickly increasing and/or the signal strength is decreasing rapidly, then Fi may be increased (e.g., using a linear function, a step function related to position and/or signal-strength, etc.).

A more specific illustrative formulation for determining the respective occurrence frequency at which each particular neighbor node is to be probed may be based on the following:

$$c/((a*\text{signal strength})+(b*\text{relative position})), \quad \text{(Eq. 1)}$$

where c is a constant, a and b are weight values, and relative position is a current location of the neighboring node having classic motion physics applied thereto given a speed vector and acceleration of a corresponding particular node.

Figure 10:
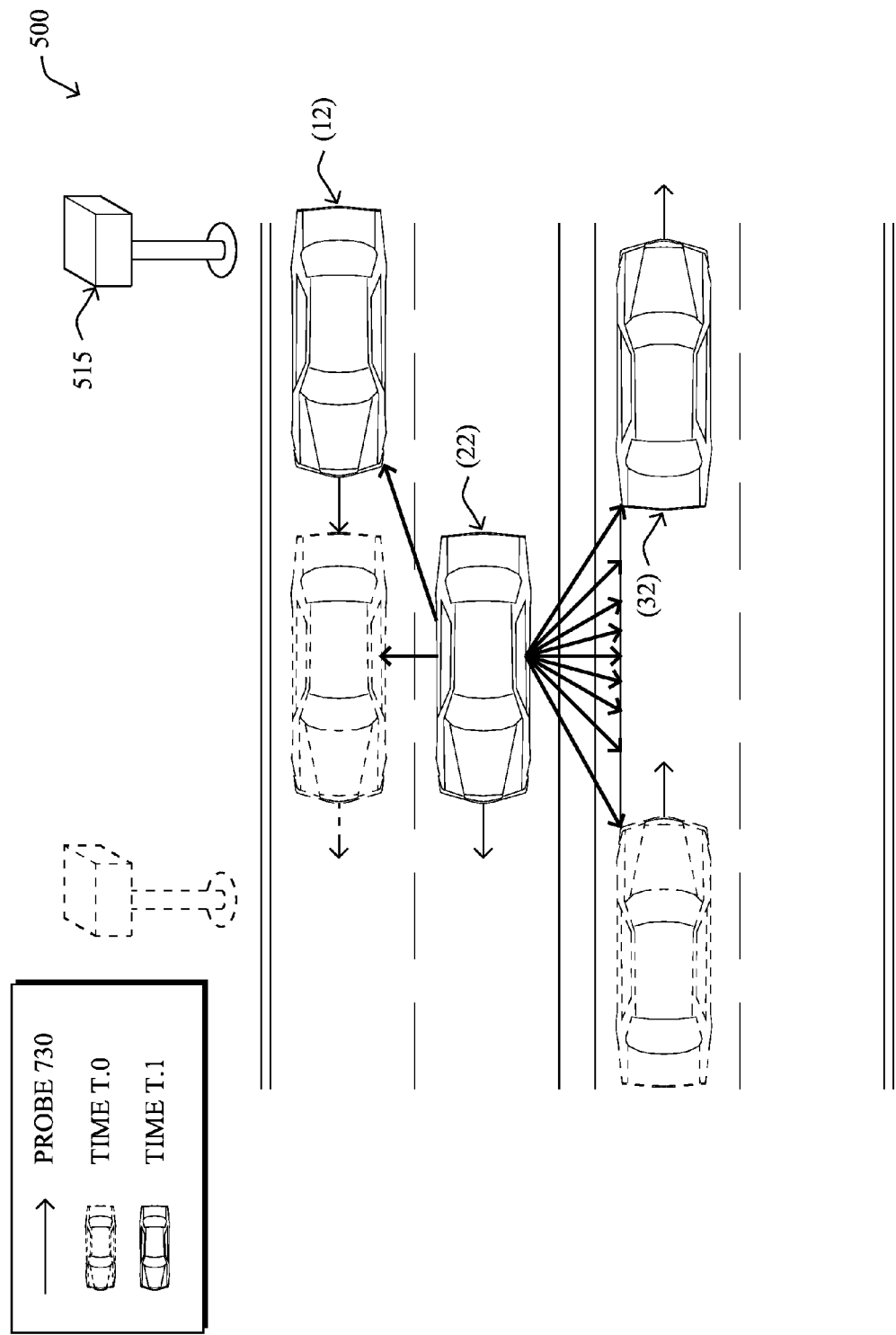
FIG. 10 illustrates another example probing frequency relationship to a rate of change in distance in the specific VANET example.

The outcome of the dynamically adjusted frequency Fi is illustrated in FIG. 10, which shows the example VANET of FIG. 5 with probes 730 shown over time during motion of the vehicles 520, and RSU 515, in relation to the perspective of vehicle/node 22. In particular, assume that the dashed outlines indicate an initial location of the devices/nodes at time T.0, and that the solid outlines indicate a subsequent location of the same devices/nodes at time T.1. Since vehicle/node 12's position relative to vehicle/node 22's position is generally stable, i.e., slow moving, there are fewer probes 730 between time T.0 and T.1. On the contrary, since vehicle/node 32 is moving quickly to the perspective of node 22, node 22 probes node 32 many more times (at a higher frequency) between time T.0 and T.1. As can be seen, more probes may be needed for node 32 than for node 12, since it is more likely that node 32 will be out of reach at a later time than would node 12 be.

Figure 11A:
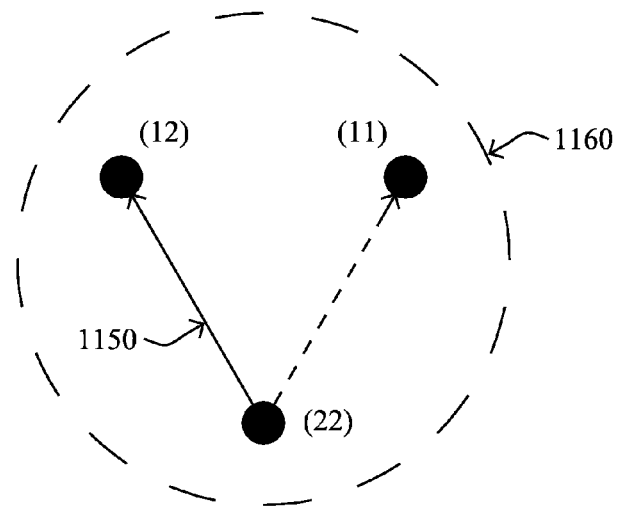
FIGS. 11A-11B illustrate an example of a suitable preferred next-hop selection.
Figure 11B:
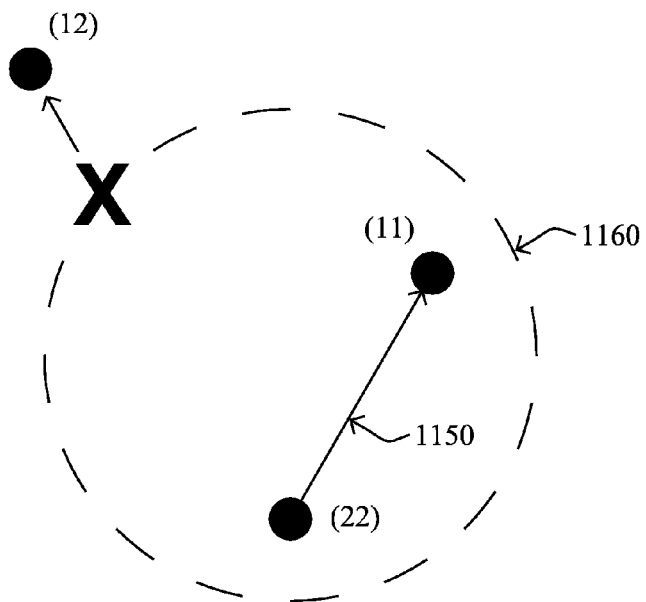

The probe replies prompt local node X (e.g., node 22) to take the appropriate action for determining whether to maintain the current next-hop selection. In particular, as shown in FIGS. 11A-11B, if at some point the distance 1150 to the selected preferred next-hop node (parent, e.g., node 12) exceeds some pre-defined threshold 1160 (that is, physical distance is too great, and/or signal strength is too small), then the selected preferred next-hop node is no longer suitable, and a new parent selection is triggered by the local node to dynamically rearrange the neighbor table 800 based on the probing to select a suitable "updated" preferred next-hop node (e.g., node 11), thereby preserving connectivity before it is lost.

Figure 12A:
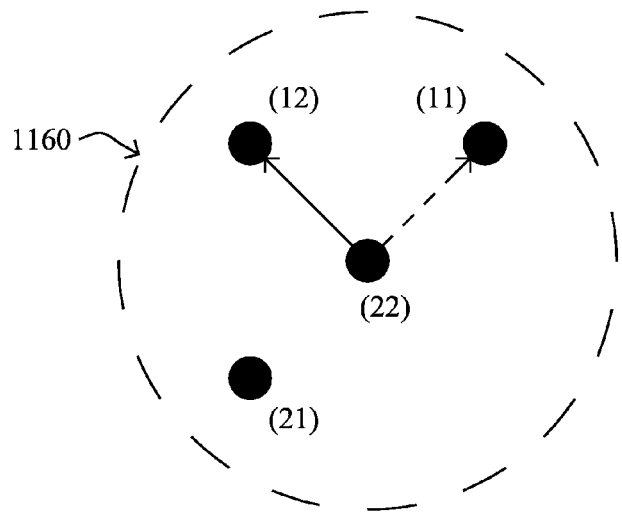
FIGS. 12A-12B illustrate an example of a suitable alternate next-hop selection.
Figure 12B:
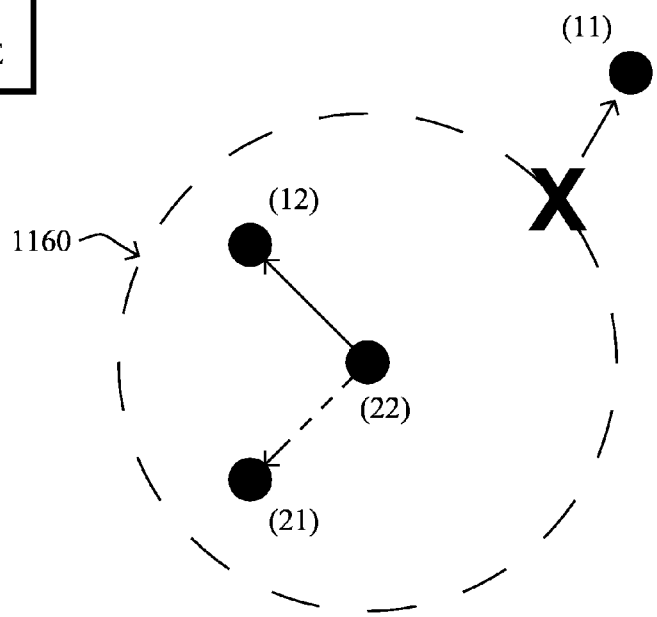

Note that in another embodiment, the tracking( ) procedure can be triggered not only for the preferred next-hop node, but also the back-up (alternate) node, thus leading to dynamically re-arranging the neighbor table to even further increase the level of accuracy. For instance, as shown in FIGS. 12A-12B, in response to determining that the selected alternate next-hop node (e.g., node 11) is no longer suitable based on the alternate next-hop node no longer being within a threshold distance 1160 from the local node (as detected by the probing), then a suitable "updated" alternate next-hop node may be selected for the corresponding routing topology (e.g., node 21) in order to also maintain connectivity with the back-up next-hop.

Figure 13:
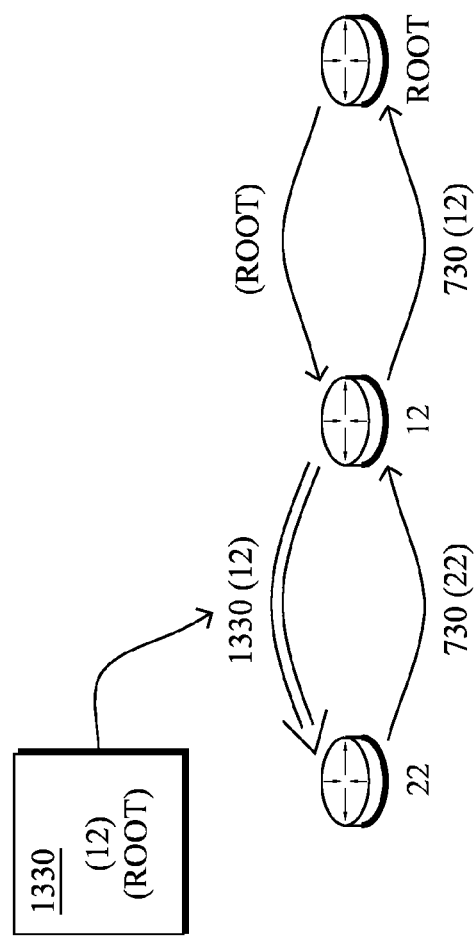
FIG. 13 illustrates an example of n-hop neighbor information sharing.

In yet another embodiment the techniques herein may be further configured to determine "n-hop" neighbor information, meaning relevant information from neighbors of neighbors, up to "n" hops away. As shown in FIG. 13, an optional TLV 1335 may be added to the fast-tracking probe reply message 1330 so as to not only keep track of the next-hop position and signal strength (e.g., for node 12) but also their own next-hops (e.g., the root node). In this manner, probing further determines n-hop neighbor information, such that the selected preferred next-hop node may be selected based on associated n-hop neighbor information via the preferred next-hop node, accordingly (e.g., which next-hop provides a better solution when also considering their next-hops). Note that the n-hop neighbor information may be limited to preferred next-hops, or may additionally include alternate next-hops, or even neighbors generally. In contrast with typical LLNs, VANET may provide much higher bandwidth, and the additional amount of n-hop information data may be negligible and could further help improve the degree of connectivity between fast-moving devices.

Notably, in accordance with one or more additional embodiments herein, a link-layer mechanism may be used to support the proactive routing in fast-moving networks such as VANETs. That is, rather than using a fast-tracking mechanism as part of the routing protocol as described above, the probes may be incorporated into layer-2 (MAC) beacon messages (beaconing frames) to reduce message overhead, delay, and control data corruption. In particular, specific advantages of using layer-2 beaconing is that the probe messages (probe and reply) can be much smaller, e.g., without encapsulation headers, etc., which also allows the delay between message generation at the source and message reception at the neighboring node to be shorter (due to smaller message size), increasing the "fast-tracking" capability. In addition, the occurrence frequency of beacon messages may have a wider range of flexibility, allowing for more accurate and precise routing metrics for route connectivity, and being able to use custom bit patterns tuned to the current channel conditions in beacon messages may allow for better position calculation.

Figure 14:
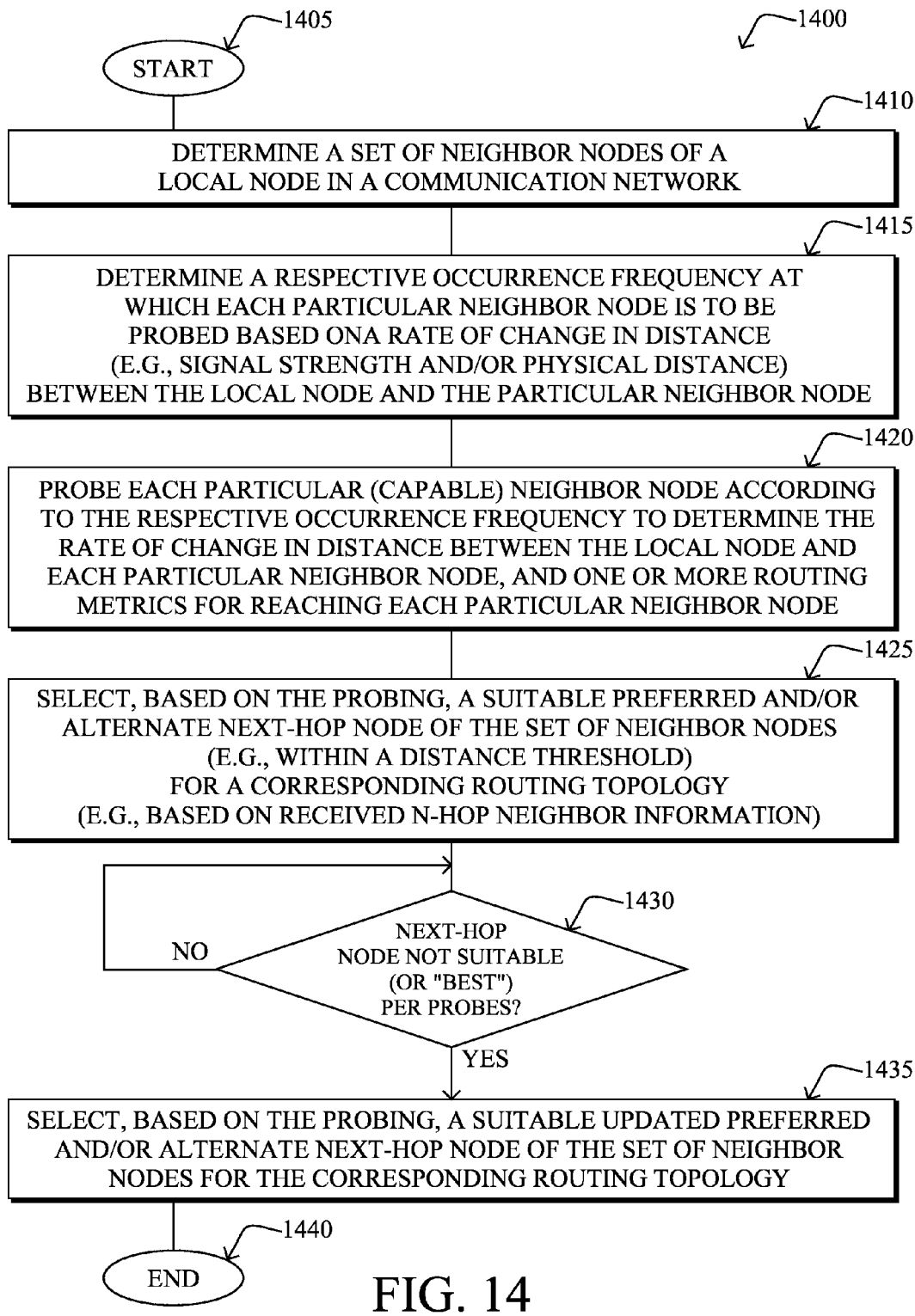
FIG. 14 illustrates an example simplified procedure for a fast-tracking approach for building routing topologies in fast-moving networks.

FIG. 14 illustrates an example simplified procedure for a fast-tracking approach for building routing topologies in fast-moving networks in accordance with one or more embodiments described herein. The procedure 1400 may start at step 1405, and continues to step 1410, where, as described in greater detail above, a local node (e.g., node 22) may determine a set of neighbor nodes in a communication network (e.g., nodes 11, 12, 21, and 32). As also described above, in step 1415, the local node may determine a respective occurrence frequency 900 at which each particular neighbor node is to be probed based on a rate of change in distance (e.g., signal strength and/or physical distance) between the local node and the particular neighbor node. Accordingly, in step 1420, the local node probes each particular (capable) neighbor node according to the respective occurrence frequency to determine the rate of change in distance between the local node and each particular neighbor node, and one or more routing metrics for reaching each particular neighbor node. Note that the probing updates the rate of change, and hence updates the probing frequency, as well.

In step 1425, the local node may select, based on the probing, a suitable preferred and/or alternate next-hop node of the set of neighbor nodes (e.g., within a distance threshold) for a corresponding routing topology. In addition, according to a specific embodiment above, such selection may be based on received n-hop neighbor information 1330. In the event that continued probes allow for the local node to determine in step 1430 that the selected next-hop node (preferred or alternate) is not suitable (or the "best" or "second best"), then in step 1435 the local node may select, based on the probing, a suitable updated preferred and/or alternate next-hop node of the set of neighbor nodes for the corresponding routing topology, accordingly.

The illustrative procedure 1400 ends in step 1440, but additional discovery messages 620 may be propagated, additional probes 730 may be sent, updates to probing frequency or next-hop selections may be made, etc. That is, while a particular order of the steps is shown, this ordering is merely illustrative, and any suitable arrangement of the steps may be utilized without departing from the scope of the embodiments herein. It should also be noted that while certain steps within procedure 1400 may be optional as described above, the steps shown in FIG. 14 are merely examples for illustration, and certain other steps may be included or excluded as desired.

The techniques described herein, therefore, provide for a fast-tracking approach for building routing topologies in fast-moving networks. In particular, the techniques herein support proactive routing connectivity maintenance in fast-moving networks, such as a VANET, and thus routing in a fast-moving environment is greatly improved by anticipating a link failure by tracking movement between devices and their changing signal quality. In particular, for both vehicles and mobile user devices, the techniques herein apply velocity (speed+direction) and distance in a manner such that if a neighbor is heading away from the local device, it makes sense to not use that neighbor as a preferred next-hop if there are other options, as the distancing neighbor may no longer be reachable by the time the local device is ready to send a message. According to the techniques herein, therefore, by adjusting the frequency at which neighbors are probed based on how rapidly their distance is changing, the local device may manage moving neighbors individually to ensure appropriate connectivity reactivity to those neighbors.

While there have been shown and described illustrative embodiments that provide for a fast-tracking approach for building routing topologies in fast-moving networks, it is to be understood that various other adaptations and modifications may be made within the spirit and scope of the embodiments herein. For example, the embodiments have been shown and described herein with relation to vehicular networks. However, the embodiments in their broader sense are not as limited, and may, in fact, be used with other types of "fast-moving" networks, such as for mobile user devices, fast-moving sensor networks, etc. Also, while the networks are described as "fast-moving," not all devices in the network need to move, even at all (e.g., RSUs 515). In addition, while certain protocols are shown, such as RPL as an underlying routing topology protocol, other suitable protocols may be used, accordingly, such as various Link-State-related routing protocols or reactive protocols or other proactive distance-vector routing protocols.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
    determining a set of neighbor nodes of a local node in a communication network;
    determining a respective occurrence frequency at which each particular neighbor node is to be probed based on a rate of change in distance between the local node and the particular neighbor node;
    probing each particular neighbor node according to the respective occurrence frequency to determine the rate of change in distance between the local node and each particular neighbor node, and one or more routing metrics for reaching each particular neighbor node; and
    selecting, based on the probing, a suitable preferred next-hop node of the set of neighbor nodes for a corresponding routing topology.

2. The method as in claim 1, wherein the distance is based on at least one of either a signal strength or a physical distance between the local node and each particular neighbor node.

3. The method as in claim 2, further comprising:
    determining that the selected preferred next-hop node is suitable based on the preferred next-hop node being within a threshold distance from the local node.

4. The method as in claim 1, further comprising:
    determining that the selected preferred next-hop node is no longer suitable based on the preferred next-hop node no longer being within a threshold distance from the local node as detected by the probing; and
    selecting, based on the probing, a suitable updated preferred next-hop node of the set of neighbor nodes for the corresponding routing topology.

5. The method as in claim 1, further comprising:
    selecting, based on the probing, a suitable alternate next-hop node of the set of neighbor nodes for the corresponding routing topology;
    determining that the selected alternate next-hop node is no longer suitable based on the alternate next-hop node no longer being within a threshold distance from the local node as detected by the probing; and
    selecting, based on the probing, a suitable updated alternate next-hop node of the set of neighbor nodes for the corresponding routing topology.

6. The method as in claim 1, wherein the occurrence frequency increases when the rate of change in distance increases, and decreases when the rate of change in distance decreases.

7. The method as in claim 1, wherein probing determines one or more of: a signal strength, a speed vector, an acceleration, a current location, and one or more routing metrics, each associated with each particular neighbor node.

8. The method as in claim 1, wherein probing utilizes layer-2 beacon messages.

9. The method as in claim 1, wherein the nodes in the communication network are selected from a group consisting of vehicles and mobile user devices.

10. The method as in claim 1, wherein routing metrics comprise a path cost.

11. The method as in claim 1, further comprising:
    limiting the probing to neighbor nodes capable of being probed.

12. The method as in claim 1, wherein the selected preferred next-hop node is selected based on having the best set of routing metrics according to a directive of a routing protocol used to compute the corresponding routing topology.

13. The method as in claim 1, wherein probing further determines n-hop neighbor information, and wherein the selected preferred next-hop node is selected based on associated n-hop neighbor information via the preferred next-hop node.

14. The method as in claim 1, wherein determining the respective occurrence frequency at which each particular neighbor node is to be probed is based on:

$$c/((a*\text{signal strength})+(b*\text{relative position})),$$

where c is a constant, a and b are weight values, and relative position is a current location having motion physics applied thereto given a speed vector and acceleration of a corresponding particular node.

15. An apparatus, comprising:
one or more network interfaces to communicate in a communication network;
a processor coupled to the network interfaces and adapted to execute one or more processes; and
a memory configured to store a process executable by the processor, the process when executed operable to:
determine a set of neighbor nodes of the apparatus;
determine a respective occurrence frequency at which each particular neighbor node is to be probed based on a rate of change in distance between the apparatus and the particular neighbor node;
probe each particular neighbor node according to the respective occurrence frequency to determine the rate of change in distance between the apparatus and each particular neighbor node, and one or more routing metrics for reaching each particular neighbor node; and
select, based on the probing, a suitable preferred next-hop node of the set of neighbor nodes for a corresponding routing topology.

16. The apparatus as in claim 15, wherein the distance is based on at least one of either a signal strength or a physical distance between the local node and each particular neighbor node.

17. The apparatus as in claim 16, wherein the process when executed is further operable to:
determine that the selected preferred next-hop node is suitable based on the preferred next-hop node being within a threshold distance from the apparatus.

18. The apparatus as in claim 15, wherein the process when executed is further operable to:
determine that the selected preferred next-hop node is no longer suitable based on the preferred next-hop node no longer being within a threshold distance from the apparatus as detected by the probing; and
select, based on the probing, a suitable updated preferred next-hop node of the set of neighbor nodes for the corresponding routing topology.

19. The apparatus as in claim 15, wherein the process when executed is further operable to:
select, based on the probing, a suitable alternate next-hop node of the set of neighbor nodes for the corresponding routing topology;
determine that the selected alternate next-hop node is no longer suitable based on the alternate next-hop node no longer being within a threshold distance from the apparatus as detected by the probing; and
select, based on the probing, a suitable updated alternate next-hop node of the set of neighbor nodes for the corresponding routing topology.

20. The apparatus as in claim 15, wherein the occurrence frequency increases when the rate of change in distance increases, and decreases when the rate of change in distance decreases.

21. The apparatus as in claim 15, wherein probing determines one or more of: a signal strength, a speed vector, an acceleration, a current location, and one or more routing metrics, each associated with each particular neighbor node.

22. The apparatus as in claim 15, wherein the process when executed to probe is further operable to: utilize layer-2 beacon messages.

23. The apparatus as in claim 15, wherein the nodes in the communication network are selected from a group consisting of vehicles and mobile user devices.

24. A tangible, non-transitory, computer-readable media having software encoded thereon, the software when executed by a processor operable to:
determine a set of neighbor nodes of a local node in a communication network;
determine a respective occurrence frequency at which each particular neighbor node is to be probed based on a rate of change in distance between the local node and the particular neighbor node;
probe each particular neighbor node according to the respective occurrence frequency to determine the rate of change in distance between the local node and each particular neighbor node, and one or more routing metrics for reaching each particular neighbor node; and
select, based on the probing, a suitable preferred next-hop node of the set of neighbor nodes for a corresponding routing topology.

* * * * *